United States Patent
Mizusawa et al.

(10) Patent No.: US 11,505,666 B2
(45) Date of Patent: Nov. 22, 2022

(54) PREPREG AND MANUFACTURING METHOD FOR SAME

(71) Applicant: TORAY INDUSTRIES, INC., Tokyo (JP)

(72) Inventors: Tomoki Mizusawa, Ehime (JP); Takayuki Fujiwara, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/963,358

(22) PCT Filed: Mar. 13, 2019

(86) PCT No.: PCT/JP2019/010295
§ 371 (c)(1),
(2) Date: Jul. 20, 2020

(87) PCT Pub. No.: WO2019/193940
PCT Pub. Date: Oct. 10, 2019

(65) Prior Publication Data
US 2021/0061967 A1  Mar. 4, 2021

(30) Foreign Application Priority Data

Apr. 2, 2018  (JP) .............................. JP2018-070555

(51) Int. Cl.
*C08J 5/24* (2006.01)
(52) U.S. Cl.
CPC ........... *C08J 5/243* (2021.05); *C08J 2363/00* (2013.01)
(58) Field of Classification Search
CPC ........... C08J 5/24; C08J 2363/00; C08J 5/243
USPC ....................................................... 523/468
See application file for complete search history.

(56) References Cited

U.S. PATENT DOCUMENTS

| 2013/0012086 | A1 | 1/2013 | Jones et al. |
| 2014/0057515 | A1 | 2/2014 | Suzuki et al. |
| 2015/0274911 | A1* | 10/2015 | Suzuki ................. B32B 7/06 428/414 |

FOREIGN PATENT DOCUMENTS

| JP | 2006-264137 A | 10/2006 |
| JP | 2017-148960 A | 8/2017 |
| WO | WO 2012/133033 A1 | 10/2012 |

OTHER PUBLICATIONS

International Search Report, issued in PCT/JP2019/010295, PCT/ISA/210, dated May 14, 2019.
Written Opinion of the International Searching Authority, issued in PCT/JP2019/010295, PCT/ISA/237, dated May 14, 2019.

* cited by examiner

*Primary Examiner* — David T Karst
(74) *Attorney, Agent, or Firm* — Birch, Stewart, Kolasch & Birch, LLP

(57) ABSTRACT

The present invention addresses the problem of providing a prepreg that has excellent short-time and low-pressure handling properties, during pasting and layering work. In order to solve the problem, this invention has the following configuration. The prepreg includes reinforcing fibers and an epoxy resin composition, has a fiber content of 90 mass % or less, and satisfies conditions (a) and (b) below. (a) When the average thickness of the prepreg is set as D (D being 3 μm or greater), the viscosity at 25° C. of the epoxy resin composition at a site (I) located at a depth of D/4 to 3D/4 from the surface on one side of the prepreg is 50,000 to 300,000 Pa·s inclusive. (b) From among sites (II) located at a depth of up to 0.5 μm from each surface on both sides of the prepreg, the viscosity at 25° C. of the epoxy resin composition at least at a site (II) on the one side is 10,000 to 40,000 Pa·s inclusive.

5 Claims, No Drawings

PREPREG AND MANUFACTURING METHOD FOR SAME

TECHNICAL FIELD

Prepreg is an intermediate base material intended for producing fiber-reinforced composite materials suitable for sports applications, aerospace applications, general industrial applications, and the like. The present invention relates to a prepreg that is high in handleability in bonding and lamination operations, particularly high in surface adhesiveness, and a method for the production thereof.

BACKGROUND ART

Being light in weight and high in strength and rigidity, fiber-reinforced composite materials formed of reinforcing fibers and matrix resins have been in wide use in such areas as sporting goods, aerospace applications, and other general industrial applications. For sporting goods, such as golf club shafts, fishing rods, and bicycle frames, reinforcing fiber composite materials are often molded into tubular shapes, and in many widely known methods, a necessary amount of a prepreg is wound around a core such as mandrel to form a laminate, followed by heat-curing the prepreg and removing the core to produce a tubular body.

For these molding methods, it is important for the prepreg to be high in adhesiveness (tackiness), among other handleability-related properties of the prepreg, and if it is not sufficiently high in this property, a required stickiness will not be achieved between the core and the prepreg or between prepreg plies, leading to peeling and lifting in the laminate. When molding a fishing rod, bicycle frame, etc., in particular, pasting of a prepreg on a core is often performed by hand, and in order to ensure a high workability and work efficiency, therefore, it is desired for the manual pasting operation to be easily carried out in a short time and with a low pressure. Patent documents 1 to 3 each proposes a method in which a resin layer having a relatively high viscosity at room temperature is laid over the prepreg surface as a technique for improving the adhesiveness of the prepreg.

PRIOR ART DOCUMENTS

Patent Documents

Patent document 1: Japanese Unexamined Patent Publication (Kokai) No. 2010-229211
Patent document 2: Japanese Unexamined Patent Publication (Kokai) No. 2006-264137
Patent document 3: Japanese Unexamined Patent Publication (Kokai) No. 2011-190430

SUMMARY OF INVENTION

Problems to be Solved by the Invention

Although the methods proposed in Patent documents 1 to 3 are suitable when the pasting operation is performed over a long period of time and under a large pressure, but they are unsuitable when the pasting operation should be carried out in a short time under a low pressure. Commonly, a resin with a decreased viscosity is used in order to provide a prepreg that can develop good adhesion rapidly under low pressure, but if a low viscosity resin is disposed on the prepreg surface, this may be disadvantageous in that the surface resin can enter into the interior of the prepreg quickly, leading to a large decrease in the adhesiveness of the prepreg over time.

Thus, an object of the present invention is to provide a prepreg that is high in handleability in pasting and laminating operations performed quickly under a low pressure.

MEANS OF SOLVING THE PROBLEMS

To solve the above problem, the prepreg according to the present invention has the following constitution.

The prepreg includes reinforcing fibers and an epoxy resin composition, has a fiber content is 90% by mass or less, and meets the following requirements (i) and (ii):

(i) having an initial prepreg tackiness of 1.4 kgf or more, and (ii) having a prepreg tackiness of 0.7 kgf or more after 72 hours.

Or the prepreg according to the present invention has the following constitution. The prepreg includes reinforcing fibers and an epoxy resin composition, has a fiber content is 90% by mass or less, and meets the following requirements (a) and (b):

(a) the epoxy resin composition in the region (I) ranging from a depth of D/4 to 3D/4, wherein D represents the average thickness of the prepreg (and D is 3 μm or more), from the surface of the prepreg has a viscosity of 50,000 Pa·s or more and 300,000 Pa·s or less at 25° C., and (b) when defining two regions (II) ranging from either surface of the prepreg into a depth of 0.5 μm, the epoxy resin composition at least in either of the regions (II) has a viscosity of 10,000 Pa·s or more and 40,000 Pa·s or less at 25° C. In addition, the method for producing the prepreg according to the present invention has the following constitution.

It is a method for prepreg production including a step in which an epoxy resin composition B having a viscosity of 10,000 Pa·s or more and 40,000 Pa·s or less at 25° C. is disposed on at least one side of a prepreg precursor containing a reinforcing fiber sheet and an epoxy resin composition A having a viscosity of 50,000 Pa·s or more and 300,000 Pa·s or less at 25° C. in such a manner that meets the following requirements (c), (d), and (e):

(c) the prepreg has a fiber content of 90% by mass or less, (d) the epoxy resin composition B has an areal weight of 1 g/m² or more, and (e) the ratio of the areal weight of the epoxy resin composition A to the areal weight of the epoxy resin composition B (or the epoxy resin composition B having the larger areal weight in the case where different epoxy resin compositions B are disposed along the two surfaces of the prepreg precursor) is 2 or more.

Advantageous Effects of the Invention

The present invention serves to provide a prepreg that maintains, for a long term, the ability to develop good adhesion rapidly under low pressure.

DESCRIPTION OF PREFERRED EMBODIMENTS

The reinforcing fiber used for the present invention may be appropriately selected from various resins that are generally used as reinforcing fibers, if having required strength, and examples thereof include chemical fibers such as carbon fiber, glass fiber, Kevlar (registered trademark), boron fiber, silicon carbide fiber, and nylon; natural fibers; and metal fibers such as alumina fiber, which may be combined together or may be combined with other organic fibers.

In particular, carbon fibers are particularly preferred because they have high tensile modulus among other reinforcing fibers. The carbon fiber to use is not particularly limited, and examples thereof include carbon fibers such as pitch based ones and polyacrylonitrile based ones, of which two or more fibers may be used as a mixture. In particular, it is preferable to use a polyacrylonitrile based carbon fiber which commonly serves to produce a prepreg having high tensile strength.

As the matrix resin in the prepreg of the present invention, an epoxy resin composition containing an epoxy resin as main component is used because of having a good balance among heat resistance, dynamic characteristics, and adhesiveness to carbon fibers.

The epoxy resin to use is not particularly limited and one or more may be selected from the following: bisphenol type epoxy resins, amine type epoxy resins, phenol novolac type epoxy resins, cresol novolac type epoxy resins, resorcinol type epoxy resins, phenol aralkyl type epoxy resins, naphthol aralkyl type epoxy resins, dicyclopentadiene type epoxy resins, epoxy resin having a biphenyl skeleton, isocyanate-modified epoxy resins, tetraphenylethane type epoxy resins, triphenylmethane type epoxy resins, and diglycidylaniline derivatives.

Here, a bisphenol type epoxy resin has a structure formed by glycidylating the two phenolic hydroxyl groups in a bisphenol compound and its examples include bisphenol A type, bisphenol F type, bisphenol AD type, or bisphenol S type epoxy resins, and halogen-substituted, alkyl-substituted, or hydrogenated forms of these bisphenols. In addition to monomers, high molecular weight mers having a plurality of repeating units can also be used. In particular, bisphenol A type epoxy resins, bisphenol F type epoxy resins, and bisphenol S type epoxy resins are preferred because of having a good balance among elastic modulus, toughness, and heat resistance.

Commercial products of such bisphenol A type epoxy resins include jER (registered trademark) 825, 828, 834, 1001, 1002, 1003, 1003F, 1004, 1004AF, 1005F, 1006FS, 1007, 1009, and 1010 (all manufactured by Mitsubishi Chemical Corporation). Commercial products of brominated bisphenol A type epoxy resin include jER (registered trademark) 505, 5050, 5051, 5054, and 5057 (all manufactured by Mitsubishi Chemical Corporation). Commercial products of hydrogenated bisphenol A type epoxy resins include ST5080, ST4000D, ST4100D, and ST5100 (all manufactured by NIPPON STEEL Chemical & Material Co., Ltd.).

Commercial products of such bisphenol F type epoxy resins include jER (registered trademark) 806, 807, 4002P, 4004P, 4007P, 4009P, and 4010P (all manufactured by Mitsubishi Chemical Corporation), and Epotohto (registered trademark) YDF2001 and YDF2004 (both manufactured by NIPPON STEEL Chemical & Material Co., Ltd.). Commercial products of tetramethyl bisphenol F type epoxy resins include YSLV-80 XY (manufactured by NIPPON STEEL Chemical & Material Co., Ltd.).

Commercial products of bisphenol S type epoxy resins include Epicron (registered trademark) EXA-154 (manufactured by DIC Corporation).

Examples of amine type epoxy resins include tetraglycidyl diaminodiphenylmethane, triglycidyl aminophenol, triglycidyl aminocresol, and tetraglycidyl xylylenediamine, as well as halogen-substituted, alkynol-substituted, or hydrogenated forms thereof.

Commercial products of tetraglycidyl diaminodiphenylmethane include Sumiepoxy (registered trademark) ELM434 (manufactured by Sumitomo Chemical Company, Limited), YH434L (manufactured by NIPPON STEEL Chemical & Material Co., Ltd.), jER (registered trademark) 604 (manufactured by Mitsubishi Chemical Corporation), and Araldite (registered trademark) MY720 and MY721 (both manufactured by Huntsman Advanced Materials). Commercial products of triglycidyl aminophenols and triglycidyl aminocresol include Sumiepoxy (registered trademark) ELM100 and ELM120 (both manufactured by Sumitomo Chemical Company, Limited), Araldite (registered trademark) MY0500, MY0510, and MY0600 (all manufactured by all Huntsman Advanced Materials), and jER (registered trademark) 630 (manufactured by Mitsubishi Chemical Corporation). Examples of tetraglycidyl xylylenediamines and hydrogenated products thereof include TETRAD-X and TETRAD-C (both manufactured by Mitsubishi Gas Chemical Co., Inc.).

Commercial products of phenol novolac type epoxy resins include jER (registered trademark) 152 and 154 (both manufactured by Mitsubishi Chemical Corporation) and Epicron (registered trademark) N-740, N-770, and N-775 (all manufactured by DIC Corporation).

Commercial products of such cresol novolac-type epoxy resins include Epicron (registered trademark) N-660, N-665, N-670, N-673, and N-695 (all manufactured by DIC Corporation), and EOCN-1020, EOCN-102S, and EOCN-104S (all manufactured by Nippon Kayaku Co., Ltd.). Commercial products of such resorcinol epoxy resins include Denacol (registered trademark) EX-201(manufactured by Nagase ChemteX Corporation).

Commercial products of such phenol aralkyl type epoxy resins include NC-2000 (manufactured by Nippon Kayaku Co., Ltd.).

Commercial products of such naphthol aralkyl type epoxy resins include Epotohto (registered trademark) ESN-155, Epotohto (registered trademark) ESN-355, Epotohto (registered trademark) ESN-375, Epotohto (registered trademark) ESN-475V, Epotohto (registered trademark) ESN-485, and Epotohto (registered trademark) ESN-175 (all manufactured by NIPPON STEEL Chemical & Material Co., Ltd.).

Commercial products of such dicyclopentadiene type epoxy resins include Epiclon (registered trademark) HP-7200, HP-7200L, HP-7200H, HP-7200HH, and HP-7200HHH (all manufactured by DIC Corporation), Tactix (registered trademark) 558 (manufactured by Huntsman Advanced Materials), and XD-1000-1L and XD-1000-2L (both manufactured by Nippon Kayaku Co., Ltd.).

Commercial products of such epoxy resins having biphenyl skeletons include jER (registered trademark) YX4000H, YX4000, and YL6616 (all manufactured by Mitsubishi Chemical Corporation), and NC-3000 (manufactured by Nippon Kayaku Co., Ltd.).

Commercial products of such isocyanate-modified epoxy resins include XAC4151 and AER4152 (manufactured by Asahi Kasei Epoxy Co., Ltd.) and ACR1348 (manufactured by Adeka Corporation), each having an oxazolidone ring.

Commercial products of such tetraphenylethane type epoxy resins include jER (registered trademark) 1031 (manufactured by Mitsubishi Chemical Corporation), which is a tetrakis(glycidyloxyphenyl) ethane type epoxy resin.

Commercial products of such triphenylmethane type epoxy resins include Tactix (registered trademark) 742 (manufactured by Huntsman Advanced Materials).

Commercial products of such diglycidyl aniline derivatives include GAN (diglycidyl aniline) and GOT (diglycidyl toluidine) (manufactured by Nippon Kayaku Co., Ltd.).

In order to increase the curability of the prepreg, a curing agent is added preferably to the epoxy resin composition used for the present invention.

The curing agent is not particularly limited, and examples thereof include amines such as aromatic amines and alicyclic amines, phenol resins, dicyandiamide, and derivatives and acid anhydrides thereof, as well as polyaminoamide, organic acid hydrazide, and isocyanate.

Examples of such aromatic amines include xylenediamine, diaminodiphenylmethane, phenylenediamine, and diaminodiphenylsulfone.

Examples of such alicyclic amines include isophorone diamine and menthene diamine.

Such phenolic resins may be produced through condensation reaction of phenols such as phenol, cresol, xylenol, t-butylphenol, nonylphenol, cashew oil, lignin, resorcin, and catechol with aldehydes such as formaldehyde, acetaldehyde, and furfural, and examples thereof include novolac resins and resol resins. A novolac resin can be produced by reacting formaldehyde with the same amount of phenol or with an excessive amount of phenol in the presence of an acid catalyst such as oxalic acid. A resol resin can be produced by reacting phenol with the same amount of formaldehyde or with an excessive amount of formaldehyde in the presence of a basic catalyst such as sodium hydroxide, ammonia, or organic amine. Commercial products of phenol resins include Sumilite Resin (registered trademark) (manufactured by Sumitomo Bakelite Co., Ltd.), Resitop (manufactured by Gun Ei Chemical Industry), and AV Light (registered trademark) (manufactured by Asahi Yukizai Corporation).

Commercial products of dicyandiamide include DICY7 and DICY15 (both manufactured by Mitsubishi Chemical Corporation).

For the production of sporting goods such as golf shafts, fishing rods, and bicycles, rapid curing at a low temperature is required, and accordingly it is preferable that a degree of curing of 95% or more is reached when the prepreg is cured at 130° C. for 2 hours. It should be noted that the degree of curing C [%] of a prepreg as referred to herein is calculated by the following equation wherein $\Delta H$ is the curing exotherm detected when an uncured prepreg is simply heated up from 50° C. at a temperature rise rate of 40° C./min in a differential scanning calorimeter (e.g., DSC 8500, manufactured by Perkin Elmer) and $\Delta H'$ is the curing exotherm detected when a uncured prepreg heated at 130° C. for 2 hours is simply heated up from 50° C. at a temperature rise rate of 40° C./min.

$$C=(\Delta H-\Delta H')/\Delta H \times 100 [\%]$$

To allow the prepreg to reach a degree of curing of 95% or more when cured at 130° C. for 2 hours, a curing accelerator is preferably added to the epoxy resin composition.

Examples of such a curing accelerator include urea compounds, tertiary amine and salts thereof, imidazole and salts thereof, triphenylphosphine and derivatives thereof, and metal carboxylates, as well as Lewis acids, Broensted acids, and salts thereof. In particular, the use of a urea compound is preferred because of having a good balance between storage stability and catalytic ability.

Examples of such a urea compound include N,N-dimethyl-N'-(3,4-dichlorophenyl)urea, toluenebis(dimethylurea), 4,4'-methylenebis(phenyldimethylurea), and 3-phenyl-1,1-dimethylurea. Commercial products of such urea compounds include DCMU99 (manufactured by Hodogaya Chemical Industry Co., Ltd.), and Omicure (registered trademark) 24, 52, and 94 (all manufactured by Emerald Performance Materials, LLC).

The epoxy resin composition used for the present invention may contain a thermoplastic resin, inorganic particles, an inorganic filler, and the like.

Examples of the thermoplastic resin include thermoplastic resins soluble in epoxy resin and organic particles such as rubber particles and thermoplastic resin particles. Examples of such thermoplastic resins soluble in epoxy resin include thermoplastic resins having hydrogen-bonding functional groups, which are expected to ensure improved adhesiveness between the resins and reinforcing fibers. Examples of such a thermoplastic resin that is soluble in epoxy resin resins and has a hydrogen-bonding functional group include thermoplastic resins having alcoholic hydroxyl groups, thermoplastic resins having amide bonds, and thermoplastic resins having sulfonyl groups.

Examples of thermoplastic resins having alcoholic hydroxyl groups include polyvinyl acetal resins such as polyvinyl formal and polyvinyl butyral, as well as polyvinyl alcohol and phenoxy resin. Examples of thermoplastic resins having amide bonds include polyamide, polyimide, and polyvinyl pyrolidone. Examples of thermoplastic resins having sulfonyl groups include polysulfone. Such polyamides, polyimides, and polysulfones may contain, in their backbone chains, an ether bond or a functional group such as carbonyl group. In such polyamides, the nitrogen atom in the amide group may have a substituent group.

Commercial products of thermoplastic resins that is soluble in epoxy resins and have hydrogen-bonding functional groups include polyvinyl acetal resin products such as Denka Butyral and Denka Formal (registered trademark) (manufactured by Denki Kagaku Kogyo Kabushiki Kaisha) and Vinylec (registered trademark) (manufactured by Chisso Corporation); phenoxy resin products such as UCAR (registered trademark) PKHP (manufactured by Union Carbide Corporation); polyamide resin products such as Macromelt (registered trademark) (manufactured by Henkel Hakusui Corporation) and Amilan (registered trademark) CM4000 (manufactured by Toray Industries, Inc.); polyimide products such as Ultem (registered trademark) (manufactured by General Electric Company) and Matrimid (registered trademark) 5218 (manufactured by Ciba); polysulfone products such as Sumikaexcel (registered trademark) (manufactured by Sumitomo Chemical Co., Ltd.) and UDEL (registered trademark) (manufactured by Solvay Advanced Polymers, L.L.C.); and polyvinyl pyrolidone products such as Luviskol (registered trademark) (manufactured by BASF Japan).

High in compatibility with epoxy resins, acrylic resins are widely used for control of viscoelasticity. Commercially available products of acrylic resins include Dianal (registered trademark) BR series (manufactured by Mitsubishi Chemical Corporation), Matsumoto Microsphere (registered trademark) M, M100, and M500 (all manufactured by Matsumoto Yushi-Seiyaku Co., Ltd.), and Nanostrength (registered trademark) E40F, M22N, and M52N (manufactured by Arkema K. K).

As a first form, it is necessary for the prepreg of the present invention to include reinforcing fibers and an epoxy resin composition, have a fiber content of 90% by mass or less, and meet the following requirements (i) and (ii):

(i) having an initial prepreg tackiness of 1.4 kgf or more, and (ii) having a prepreg tackiness of 0.7 kgf or more after 72 hours.

Here, the initial prepreg tackiness is the tackiness of a prepreg immediately after the manufacture of the prepreg or, in the case where the surface of the prepreg in the manufacturing process is covered with a film-like material in order to protect the surface from outside air, immediately after the removal of the cover film, whereas the prepreg tackiness after 72 hours is the tackiness of a prepreg after the surface of the prepreg deprived of the cover film has been left to stand for 72 hours in an environment having a temperature of 24±2° C. and a humidity of 50±5% RH. It should be noted that the prepreg tackiness referred to here can be determined by using a tack tester (e.g., EMX-1000N, manufactured by Imada Co., Ltd.), in which a prepreg specimen of 18×18 mm$^2$ is pressed against another piece of the prepreg for 0.1 second under a load of 0.5 kgf (5 N) and pulled at a rate of 500 mm/min, followed by measuring the resisting force when peeling occurs. A prepreg having an initial tackiness of 1.4 kgf or more and a tackiness of 0.7 kgf or more after 72 hours can maintain a high low-pressure, short-contact tackiness for a long period of time and show good pasting properties when used in manual operations for producing sporting goods such as golf shafts, fishing rods, and bicycles. For the present invention, good adhesion means showing both a high initial prepreg tackiness (also referred to as initial tack) and a high prepreg tackiness after 72 hours (also referred to as tack after 72 hours).

It is preferable for the first form of the prepreg of the present invention, furthermore, to meet the following requirement (iii):

(iii) containing an epoxy resin composition having an average viscosity at 25° C. of 45,000 Pa·s or more.

In addition, it is preferable for the first form of the prepreg of the present invention to include reinforcing fibers and an epoxy resin composition, have a fiber content of 90% by mass or less, and meet the following requirements (a) and (b):

(a) the epoxy resin composition in the region (I) ranging from a depth of D/4 to 3D/4, wherein D represents the average thickness of the prepreg (and D is 3 μm or more), from the surface of the prepreg has a viscosity of 50,000 Pa·s or more and 300,000 Pa·s or less at 25° C., and (b) when defining two regions (II) ranging from either surface of the prepreg into a depth of 0.5 μm, the epoxy resin composition at least in either of the regions (II) has a viscosity of 10,000 Pa·s or more and 40,000 Pa·s or less at 25° C.

The average thickness D of a prepreg referred to herein can be determined by photographing a cross section of the prepreg enlarged by 200 times or more under an epi-illumination type optical microscope, measuring the distance between the surfaces at five points aligned in the lateral direction, and calculating the average. The viscosity and storage modulus of an epoxy resin composition referred to herein are the complex viscosity η* and storage modulus G', respectively, determined by using a dynamic viscoelastic measuring apparatus (e.g., ARES G2, manufactured by TA Instrument) that has parallel flat plates each having a diameter of 8 mm as the upper and lower measuring jigs, in which the specimen is maintained at a measuring temperature and subjected to measurement under the conditions of a frequency of 1.00 Hz and a plate gap of 1 mm. The surface layer of the prepreg is peeled off using a tape or the like, and the region (I) ranging from a depth of D/4 to 3D/4 from the surface is exposed while confirming the thickness under an epi-illumination type optical microscope, and a 50 mg specimen of the resin composition is sampled using a spatula or the like, thus permitting the measurement of the viscosity and storage modulus of the epoxy resin composition present in the region (I). In addition, while confirming the thickness under an epi-illumination type optical microscope, a 50 mg specimen of the resin composition is sampled using a spatula or the like from a region (II) ranging from either surface into a depth of 0.5 μm in the prepreg, thus permitting the measurement of the viscosity of the epoxy resin composition present in the region (II). Furthermore, the average viscosity of the epoxy resin composition contained in the prepreg can be determined by extracting the epoxy resin composition contained in the prepreg into a solvent such as methyl ethyl ketone and evaporating the solvent to collect the resin composition for determination.

In order that a portion of the epoxy resin composition having a viscosity of 50,000 Pa·s or more and 300,000 Pa·s or less at 25° C. is localized in the region (I) and also that a portion of the epoxy resin composition having a viscosity of 10,000 Pa·s or more and 40,000 Pa·s or less at 25° C. is localized at least in either region (II), it is preferable that the prepreg has an average thickness D of 3 μm or more.

If the epoxy resin composition at least in either of the regions (II) has a viscosity of 10,000 Pa·s or more at 25° C., it serves to prevent the stickiness from increasing excessively during the handling of the prepreg. Furthermore, the epoxy resin composition at least in either of the regions (II) should have a viscosity of 40,000 Pa·s or less, preferably 38,000 Pa·s or less, and more preferably 31,000 Pa·s or less, at 25° C. In that case, when prepreg sheets are adhered to each other, the surface resins in the sheets will be highly compatible with each other to develop good adhesion rapidly under low pressure.

The resin present in a region (II) is prevented from entering into the fiber layer inside the prepreg to allow a high adhesiveness to be maintained for a long period of time if the epoxy resin composition in the region (I) has a viscosity of 50,000 Pa·s or more, preferably 100,000 Pa·s or more, and more preferably 140,000 Pa·s or more, at 25° C. Furthermore, the prepreg will have improved drapability and higher stickiness if the epoxy resin composition present in a region (I) has a viscosity of 300,000 Pa·s or less at 25° C.

For the first form of the prepreg of the present invention, it is preferable that the epoxy resin composition at least in either region (II) of the two regions (II) in the prepreg not only has a viscosity of 10,000 Pa·s or more and 40,000 Pa·s or less at 25° C., but also has a storage modulus of 30,000 Pa or more and 80,000 Pa or less at 25° C. A storage modulus in this range at 25° C. serves to hold the resin in the surface layer more strongly and prevent the prepreg sheets, once bonded, from being peeled off easily.

It is preferable for the first form of the prepreg of the present invention to have a degree of curing of 95% or more after curing at 130° C. for 2 hours. If the prepreg, cured at 130° C. for 2 hours, has a degree of curing in this range, its molding can be carried out quickly at a low temperature, leading to an increased productivity.

Furthermore, it is preferable for the first form of the prepreg of the present invention to have a fiber content of 60% by mass or more and 90% by mass or less. If having a fiber content of 90% by mass or less, the prepreg will have a stable shape. On the other hand, if the prepreg has a fiber content of 60% by mass or more, it will serve to produce a fiber reinforced composite material that has not only a light weight but also good mechanical properties such as strength and rigidity.

For the first form of the prepreg of the present invention, it is preferable that the epoxy resin composition present in the region (I) has a viscosity of 1 Pa·s or more and 80 Pa·s or less at 80° C. If the viscosity at 80° C. is less than 1 Pa·s, the resin may flow towards both ends during impregnation of the reinforcing fiber and the resin may finally flow out of the base, possibly leading to a decrease in areal weight or deterioration in working efficiency. If the viscosity at 80° C. is more than 80 Pa·s, on the other hand, impregnation of the reinforcing fiber will not be performed properly, and many voids will be formed during the molding step, resulting in molded articles having poor physical properties.

For the first form of the prepreg of the present invention, it is preferable for the reinforcing fiber to be carbon fiber. Carbon fiber has high tensile modulus compared to other fibers used for reinforcement and serves to produce fiber reinforced composite materials having good mechanical physical properties.

As a second form, it is necessary for the prepreg of the present invention to have a fiber content of 90% by mass or less and meet the following requirements (a) and (b):

(a) the epoxy resin composition at a position (I) located at a depth of D/4 to 3D/4, wherein D represents the average thickness of the prepreg (and D is 3 µm or more) from the surface of the prepreg has a viscosity of 50,000 Pa·s or more and 300,000 Pa·s or less at 25° C., and (b) when defining two regions (II) ranging from either surface of the prepreg into a depth of 0.5 µm, the epoxy resin composition at least in either of the regions (II) has a viscosity of 10,000 Pa·s or more and 40,000 Pa·s or less at 25° C.

It is preferable for the second form of the prepreg of the present invention to have the features described above in relation to the first form of the prepreg of the present invention.

It is necessary for the method for producing the prepreg of the present invention to include a step in which an epoxy resin composition B having a viscosity of 10,000 Pa·s or more and 40,000 Pa·s or less at 25° C. is disposed on at least one side of a prepreg precursor containing a reinforcing fiber sheet and an epoxy resin composition A having a viscosity of 50,000 Pa·s or more and 300,000 Pa·s or less at 25° C. in such a manner that meets the following requirements (c), (d), and (e):

(c) the fiber content of the prepreg is 90% by mass or less, (d) the epoxy resin composition B has an areal weight of 1 g/m² or more, and (e) the ratio of the areal weight of the epoxy resin composition A to the areal weight of the epoxy resin composition B (or the epoxy resin composition B having the larger areal weight in the case where different epoxy resin compositions B are disposed on two sides of the prepreg precursor) is 2 or more.

There are no specific limitations on the method to be used for the production of a prepreg precursor that includes a reinforcing fiber sheet and an epoxy resin composition A, and a generally known production method may be used for the production. Examples include a wet method in which an epoxy resin composition is dissolved in a solvent such as methyl ethyl ketone and methanol to produce a solution with a decreased viscosity and then used for impregnation, and a hot melt method (dry method) in which an epoxy resin composition is heated to decrease its viscosity and then used for impregnation. In the wet method, reinforcing fiber is immersed in the solution of the epoxy resin composition and then pulled out, followed by evaporating the solvent using a tool such as oven. In the hot melt method, the epoxy resin composition, with its viscosity decreased by heating, is used to directly impregnate a fiber base containing the reinforcing fiber, or films are prepared by coating mold release paper, etc. with the epoxy resin composition and then used to cover either or both sides of a fiber base containing the reinforcing fiber, followed by pressing while heating so that the fiber base containing the reinforcing fiber is impregnated with the epoxy resin composition. The hot melt method is preferred because the resulting prepreg will be substantially free of residual solvent.

The disposition of the epoxy resin composition B on at least one side of the prepreg precursor may be achieved either by directly applying the resin B over a surface of the prepreg precursor, or preparing, in advance, a film consisting of a mold release sheet, etc. and the resin B applied thereto, followed by attaching it to a surface of the prepreg precursor to transfer the resin. Useful methods for applying the resin B to the prepreg precursor include, for example, the use of a knife coater, die coater, lip coater, gravure coater, etc. that can apply resin at a constant rate while controlling the areal weight. Useful methods for preparing a resin film in advance include a method in which the resin B is applied to a mold release sheet using a tool as described above such as knife coater, die coater, lip coater, or gravure coater and another method that uses a reverse roll coater or a top feed reverse roll coater that can control the areal weight by changing the roll rotation speed and the clearance between the rolls. There are no specific limitations on the method to use for preparing a resin film in advance and attaching it to the prepreg precursor to transfer the resin, but a good method is to attach the resin-carrying surface of the resin film to a surface of the prepreg and apply a pressure, for example, at room temperature or at an appropriately elevated temperature where the resin does not deteriorate. Here, the transfer of the resin B in the film to the prepreg precursor is preferably performed under a low pressure so that the resin B can be localized near either surface of the prepreg in order to prevent it from being mixed with the resin A.

For the prepreg production method of the present invention, the epoxy resin composition A has a viscosity of 50,000 Pa·s or more, preferably 100,000 Pa·s or more, and more preferably 140,000 Pa·s or more, at 25° C. to prevent the resin in the prepreg surface layer from entering into the fiber layer, thereby allowing a high adhesiveness to be maintained for a long period of time. If the epoxy resin composition present has a viscosity of 300,000 Pa·s or less at 25° C., furthermore, the resulting prepreg will have improved drapability and higher stickiness.

If the epoxy resin composition B used for the prepreg production method of the present invention has a viscosity of 10,000 Pa·s or more at 25° C., furthermore, it serves to prevent the stickiness from increasing excessively during the handling of the prepreg. The epoxy resin composition B should have a viscosity of 40,000 Pa·s or less, preferably 38,000 Pa·s or less, and more preferably 31,000 Pa·s or less, at 25° C. In that case, when resulting prepreg sheets are adhered to each other, the surface resins in the sheets will be highly compatible with each other to develop good adhesion rapidly under low pressure.

For the prepreg production method of the present invention, furthermore, it is necessary that the epoxy resin composition B has an areal weight of 1 g/m² or more and that the ratio of the areal weight of the epoxy resin composition A to the areal weight of the epoxy resin composition B (or the epoxy resin composition B having the larger areal weight in the case where different epoxy resin compositions B are disposed along the two surfaces of the prepreg precursor) is 2 or more. If the epoxy resin compositions A and B have areal weight values in this range, the adhesiveness of the prepreg can be improved effectively to permit stable development of mechanical physical properties in the resulting fiber reinforced composite material. Furthermore, for the same reason, it is preferable that the epoxy resin composition B is disposed only on the surface that is desired to have improved adhesiveness, and that it is disposed on either surface rather than on both surfaces of the prepreg precursor.

It should be noted that there are no particular limitations on the epoxy resin composition present in a region (III) other than the region (I) and regions (II) in the prepreg of the present invention, but when a prepreg is produced by the above production method, the epoxy resin composition present in such a region (III) commonly has a viscosity of 10,000 Pa·s or more and 300,000 Pa·s or less at 25° C.

For the prepreg production method of the present invention, it is preferable that the epoxy resin composition B has a storage modulus of 30,000 Pa or more and 80,000 Pa or less at 25° C. If the epoxy resin composition B has a storage modulus in this range at 25° C., it serves to hold the resin in the surface layer more strongly and prevent the prepreg sheets, once bonded, from being peeled off easily.

For the prepreg production method of the present invention, it is preferable for the prepreg to have a fiber content of 60% by mass or more and 90% by mass or less. If having a fiber content of 90% by mass or less, the prepreg will have a stable shape. On the other hand, if the prepreg has a fiber content of 60% by mass or more, it will serve to produce a fiber reinforced composite material that has not only a light weight but also good mechanical properties such as strength and rigidity.

For the prepreg production method of the present invention, it is preferable that the epoxy resin composition A has a viscosity of 1 Pa·s or more and 80 Pa·s or less at 80° C. If the epoxy resin composition has a viscosity of less than 1 Pa·s at 80° C., the resin may flow towards both ends during impregnation of the reinforcing fiber and the resin may finally flow out of the base, possibly leading to a decrease in areal weight or deterioration in working efficiency. If the viscosity at 80° C. is more than 80 Pa·s, on the other hand, impregnation of the reinforcing fiber will not be performed properly, and many voids will be formed during the molding step, resulting in molded articles having poor physical properties.

For the prepreg production method of the present invention, furthermore, it is preferable for the reinforcing fiber to be carbon fiber. Carbon fiber has high tensile modulus compared to other fibers used for reinforcement and serves to produce fiber reinforced composite materials having good mechanical physical properties.

EXAMPLES

The invention is described in more detail below with reference to Examples. It should be noted that the present invention should not be construed as limited to the Examples provided below.

The matrix resins and carbon fibers used in the Examples and Comparative examples are as described below.

<Epoxy Resin> bisphenol A type epoxy resin (jER (registered trademark) 828, manufactured by Mitsubishi Chemical Corporation, epoxy equivalent 189)

bisphenol A type epoxy resin (jER (registered trademark) 1001, manufactured by Mitsubishi Chemical Corporation, epoxy equivalent 475)

phenol novolac type epoxy resin (jER (registered trademark) 154, manufactured by Mitsubishi Chemical Corporation Corporation), epoxy equivalent 178)

m-aminophenol type epoxy resin (Araldite (registered trademark) MY0600, manufactured by Huntsman Advanced Materials), epoxy equivalent 116)

<Curing Agent>

4,4'-diaminodiphenyl sulfone (Seikacure (registered trademark) S, manufactured by Wakayama Seika Kogyo Co., Ltd., active hydrogen equivalent 62)

dicyandiamide (DICY7, manufactured by Mitsubishi Chemical Corporation, active hydrogen equivalent 12)

<Curing Accelerator>

3-(3,4-dichlorophenyl)-1,1-dimethylurea (DCMU99, manufactured by Hodogaya Chemical Co., Ltd.)

<Thermoplastic Resin> polyvinyl formal (Vinylec (registered trademark) K, manufactured by JNC Corporation)

S-B-M copolymer (Nanostrength (registered trademark) M22N, manufactured by Alkenma K. K.; S, B, and M respectively mean styrene, 1,4-butadiene, and methyl methacrylate.)

polyethersulfone (Sumikaexcel (registered trademark) PES5003P, manufactured by Sumitomo Chemical Co., Ltd.)

<Reinforcing Fiber> carbon fiber (Torayca (registered trademark) T700SC-12K, manufactured by Toray Industries, tensile modulus 230 GPa, tensile strength 4900 Mpa)

carbon fiber (Torayca (registered trademark) M40JB-6K, manufactured by Toray Industries, tensile modulus 377 GPa, tensile strength 4400 Mpa)

carbon fiber (Torayca (registered trademark) T1100GC-12K, manufactured by Toray Industries, tensile modulus 324 GPa, tensile strength 7000 Mpa)

<Preparation of Epoxy Resin Composition>

After preparing specified numbers of parts by mass of an epoxy resin, curing agent, curing accelerator, and thermoplastic resin as shown in Table 1, the epoxy resin and the thermoplastic resin were melt-kneaded and then cooled, followed by adding the curing agent and the curing accelerator to provide epoxy resin compositions (a) to (I).

The methods used for measuring the various characteristics (physical properties) in each Example and Comparative Example are as Described Below <Method for Measuring Thickness>

A cross section of each prepreg obtained was photographed under an epi-illumination optical microscope at a magnification of 200 or more in such a manner that the upper and lower surfaces of the prepreg were included in the field of view. The distance between the surfaces was measured at five points aligned in the lateral direction in the cross-sectional photograph, and the average of the measurements was adopted to represent the average thickness D of the prepreg.

<Method for Measuring Viscosity and Storage Modulus>

The surface layer of the resulting prepreg is peeled off using a piece of tape, and while confirming the thickness under an epi-illumination type optical microscope, the region (I) ranging from a depth of D/4 to 3D/4 from either surface was exposed and a 50 mg specimen of the resin composition was sampled using a spatula. In addition, while confirming the thickness under an epi-illumination type optical microscope, a 50 mg specimen of the resin composition was sampled using a spatula from a region (II) ranging from a surface to a depth of 0.5 μm in the prepreg. Then, the epoxy resin composition contained in the prepreg was extracted in methyl ethyl ketone and a resin composition specimen for average viscosity determination was obtained by evaporating methyl ethyl ketone.

The viscosity and storage modulus of the resulting epoxy resin composition were measured by using a dynamic viscoelasticity measuring machine (ARES G2, manufactured by TA Instrument) equipped with flat parallel plates with a diameter of 8 mm installed on the upper and lower measuring jigs. The specimen was set in such a manner that the distance between the upper and lower measuring jigs was controlled at 1 mm, and measurements were made at a frequency of 1.00 Hz while maintaining an appropriate measuring temperature. The strain was set to 0.1% when the measuring temperature was 25° C., whereas it was set to 100% when the measuring temperature was 80° C.

<Method for Measuring Degree of Curing>

The degree of curing C [%] of a prepreg was calculated by the following equation, wherein ΔH is the curing exotherm detected when the as-prepared prepreg was simply heated up from 50° C. at a temperature rise rate of 40° C./min in a differential scanning calorimeter (DSC 8500, manufactured by Perkin Elmer) and ΔH' is the curing exotherm detected when the prepreg, once heated at 130° C. for 2 hours and cooled to 50° C., is simply heated up from 50° C. at a temperature rise rate of 40° C./min.

$$C=(\Delta H-\Delta H')/\Delta H \times 100 [\%]$$

<Method for Measuring Prepreg Tackiness>

The prepreg tackiness was determined by using a tack tester (EMX-1000N, manufactured by Imada Co., Ltd.), in which a prepreg specimen of 18×18 mm$^2$ is pressed against another piece of the same prepreg prepared elsewhere for 0.1 second under a load of 0.5 kgf (5 N) and pulled at a rate of 500 mm/min while measuring the resisting force that occurs when it is peeled off. Five measurements were taken and their average was adopted to represent the prepreg tackiness. Here, the initial prepreg tackiness is the tackiness of a prepreg immediately after the manufacture of the prepreg or, in the case where the surface of the prepreg in the manufacturing process is covered with a film-like material in order to protect the surface from outside air, immediately after the removal of the cover film, whereas the prepreg tackiness after 72 hours is the tackiness of a prepreg after the surface of the prepreg deprived of the cover film has been left to stand for 72 hours in an environment having a temperature of 24±2° C. and a humidity of 50±5% RH.

<Method for Wrap-Around Test for Prepreg>

In a the environment at temperature of 24±2° C. and humidity of 50±5% RH, a prepreg with a size of 200×200 mm$^2$ was wrapped around a SUS cylinder having a diameter of 20 mm over 10 seconds at a load of 0.5 kgf so that paralleled reinforcing fibers were aligned in a direction at an angle of 90° from the length direction of the cylinder, followed by observing temporal changes in the wrap-around state of the prepreg. If the wraparound prepreg has peeled off with its end coming off to a maximum height of 2 mm or more, it is judged that "peeling is existent" in the prepreg.

Example 1

As shown in the column for Example 1 in Table 2, the epoxy resin composition (a) was used as the resin A and applied to mold release paper using a coater to prepare resin films having a resin areal weight of 44 g/m$^2$. Two of these resin films were attached to both surfaces of a sheet of reinforcing fibers (Torayca (registered trademark) T700SC-12K) aligned in one direction, and a pressure was applied while heating to ensure impregnation with the epoxy resin composition (a), thus preparing a prepreg precursor. Subsequently, the epoxy resin composition (b) was used as the resin B and applied to mold release paper using a coater to prepare resin films having a resin areal weight of 12 g/m$^2$. One of these resin film was attached to a surface of the prepreg precursor prepared above and a pressure was applied while heating to prepare a prepreg having a fiber areal weight of 100 g/m$^2$ and a fiber mass content of 50%. The areal weight of the prepreg was 200 g/m$^2$, and the average thickness of the prepreg was 151 μm. The viscosity in the region (I) of this prepreg was 148,900 Pa·s and 15 Pa·s at 25° C. and 80° C., respectively. In addition, the viscosity and the storage modulus in the region (II) adjacent to the surface carrying the resin B were 23,800 Pa·s and 101,500 Pa, respectively, at 25° C. Furthermore, the viscosity of the epoxy resin composition contained in the prepreg was 124,600 Pa·s at 25° C. Prepreg tackiness of the resulting prepreg was measured, and results showed that the initial tackiness was 2.3 kgf (23 N) and the tackiness after 72 hours was 1.6 kgf (16 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 70%.

Example 2

As shown in the column for Example 2 in Table 2, a resin film of the resin A having an areal weight of 13 g/m$^2$ was used, and except for this, the same procedure as in Example 1 was carried out to prepare a prepreg having a fiber areal weight of 100 g/m$^2$ and a fiber mass content of 72%. The prepreg had an areal weight of 138 g/m$^2$, indicating that it is lighter in weight than in Example 1. Furthermore, the prepreg had an average thickness of 96 μm. The viscosity in the region (I) of this prepreg was 148,900 Pa·s and 15 Pa·s at 25° C. and 80° C., respectively. In addition, the viscosity and the storage modulus in the region (II) were 23,800 Pa·s and 101,500 Pa, respectively, at 25° C. Furthermore, the viscosity of the epoxy resin composition contained in the prepreg was 118,700 Pa·s at 25° C. Prepreg tackiness of the resulting prepreg was measured, and results showed that the initial tackiness was 1.5 kgf (15 N) and the tackiness after 72 hours was 0.9 kgf (9 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 80%, proving a higher degree of curing than in Example 1.

Example 3

As shown in the column for Example 3 in Table 2, the resin composition (c) was used as the resin, and except for this, the same procedure as in Example 2 was carried out to prepare a prepreg having a fiber areal weight of 100 g/m$^2$ and a fiber mass content of 72%. The areal weight of the prepreg was 138 g/m$^2$, and the average thickness of the prepreg was 95 μm. The viscosity in the region (I) of this prepreg was 61,400 Pa·s and 9 Pa·s at 25° C. and 80° C., respectively. In addition, the viscosity and the storage modulus in the region (II) were 23,800 Pa·s and 101,500 Pa, respectively, at 25° C. Furthermore, the viscosity of the epoxy resin composition contained in the prepreg was 52,100 Pa·s at 25° C. Prepreg tackiness of the resulting prepreg was measured, and results showed that the initial tackiness was 1.5 kgf (15 N) and the tackiness after 72 hours was 0.8 kgf (8 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%, proving a higher degree of curing than in Example 2.

Example 4

As shown in the column for Example 4 in Table 2, the resin composition (d) was used as the resin B, and except for this, the same procedure as in Example 3 was carried out to prepare a prepreg having a fiber areal weight of 100 g/m$^2$ and a fiber mass content of 72%. The areal weight of the prepreg was 138 g/m$^2$, and the average thickness of the prepreg was 95 μm. The viscosity in the region (I) of this prepreg was 61,400 Pa·s and 9 Pa·s at 25° C. and 80° C., respectively. In addition, the viscosity and the storage modulus in the region (II) were 14,700 Pa·s and 28,200 Pa, respectively, at 25° C. Furthermore, the viscosity of the epoxy resin composition contained in the prepreg was 50,800 Pa·s at 25° C. Prepreg tackiness of the resulting prepreg was measured, and results showed that the initial tackiness was 1.4 kgf (14 N) and the tackiness after 72 hours was 0.7 kgf (7 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 5

As shown in the column for Example 5 in Table 2, the resin composition (e) was used as the resin B, and except for this, the same procedure as in Example 4 was carried out to prepare a prepreg having a fiber areal weight of 100 g/m$^2$ and a fiber mass content of 72%. The areal weight of the prepreg was 138 g/m$^2$, and the average thickness of the prepreg was 96 μm. The viscosity in the region (I) of this prepreg was 61,400 Pa·s and 9 Pa·s at 25° C. and 80° C., respectively. In addition, the viscosity and the storage modulus in the region (II) were 10,300 Pa·s and 76,600 Pa, respectively, at 25° C. Furthermore, the viscosity of the epoxy resin composition contained in the prepreg was 45,800 Pa·s at 25° C. Prepreg tackiness of the resulting prepreg was measured, and results showed that the initial tackiness was 2.3 kgf (23 N) and the tackiness after 72 hours was 1.1 kgf (11 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 6

As shown in the column for Example 6 in Table 2, the resin composition (f) was used as the resin B, and except for this, the same procedure as in Example 5 was carried out to prepare a prepreg having a fiber areal weight of 100 g/m$^2$ and a fiber mass content of 72%. The areal weight of the prepreg was 138 g/m$^2$, and the average thickness of the prepreg was 95 μm. The viscosity in the region (I) of this prepreg was 61,400 Pa·s and 9 Pa·s at 25° C. and 80° C., respectively. In addition, the viscosity and the storage modulus in the region (II) were 37,600 Pa·s and 37,400 Pa, respectively, at 25° C. Furthermore, the viscosity of the epoxy resin composition contained in the prepreg was 54,600 Pa·s at 25° C. Prepreg tackiness of the resulting prepreg was measured, and results showed that the initial tackiness was 1.7 kgf (17 N) and the tackiness after 72 hours was 0.8 kgf (8 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 7

As shown in the column for Example 7 in Table 2, the resin composition (g) was used as the resin A, and except for this, the same procedure as in Example 6 was carried out to prepare a prepreg having a fiber areal weight of 100 g/m$^2$ and a fiber mass content of 72%. The areal weight of the prepreg was 138 g/m$^2$, and the average thickness of the prepreg was 98 μm. The viscosity in the region (I) of this prepreg was 255,600 Pa·s and 1 Pa·s at 25° C. and 80° C., respectively. In addition, the viscosity and the storage modulus in the region (II) were 37,600 Pa·s and 37,400 Pa, respectively, at 25° C. Furthermore, the viscosity of the epoxy resin composition contained in the prepreg was 192,400 Pa·s at 25° C. Prepreg tackiness of the resulting prepreg was measured, and results showed that the initial tackiness was 1.8 kgf (18 N) and the tackiness after 72 hours was 1.2 kgf (12 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 8

As shown in the column for Example 8 in Table 2, a resin film of the resin A having an areal weight of 23 g/m$^2$ was used, and except for this, the same procedure as in Example 7 was carried out to prepare a prepreg having a fiber areal weight of 100 g/m$^2$ and a fiber mass content of 63%. The areal weight of the prepreg was 158 g/m$^2$, and the average thickness of the prepreg was 114 μm. The viscosity in the region (I) of this prepreg was 255,600 Pa·s and 1 Pa·s at 25° C. and 80° C., respectively. In addition, the viscosity and the storage modulus in the region (II) were 37,600 Pa·s and 37,400 Pa, respectively, at 25° C. Furthermore, the viscosity of the epoxy resin composition contained in the prepreg was 220,000 Pa·s at 25° C. Prepreg tackiness of the resulting prepreg was measured, and results showed that the initial tackiness was 1.9 kgf (19 N) and the tackiness after 72 hours was 1A kgf (14 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 9

As shown in the column for Example 9 in Table 3, a resin film of the resin A having an areal weight of 9 g/m$^2$ was used, and except for this, the same procedure as in Example 7 was carried out to prepare a prepreg having a fiber areal weight of 100 g/m$^2$ and a fiber mass content of 84%. The areal weight of the prepreg was 119 g/m$^2$, and the average thickness of the prepreg was 80 μm. The viscosity in the region (I) of this prepreg was 255,600 Pa·s and 1 Pa·s at 25° C. and 80° C., respectively. In addition, the viscosity and the storage modulus in the region (II) were 37,600 Pa·s and 37,400 Pa, respectively at 25° C. Furthermore, the viscosity of the epoxy resin composition contained in the prepreg was 246,700 Pa·s at 25° C. Prepreg tackiness of the resulting prepreg was measured, and results showed that the initial tackiness was 1.6 kgf (16 N) and the tackiness after 72 hours was 0.8 kgf (8 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 10

As shown in the column for Example 10 in Table 3, Torayca (registered trademark) M40JB-6K was used as the reinforcing fiber, and except for this, the same procedure as in Example 7 was carried out to prepare a prepreg having a fiber areal weight of 100 g/m$^2$ and a fiber mass content of 72%. The areal weight of the prepreg was 138 g/m$^2$, and the average thickness of the prepreg was 100 μm. The viscosity in the region (I) of this prepreg was 255,600 Pa·s and 1 Pa·s at 25° C. and 80° C., respectively. In addition, the viscosity and the storage modulus in the region (II) were 37,600 Pa·s and 37,400 Pa, respectively, at 25° C. Furthermore, the viscosity of the epoxy resin composition contained in the prepreg was 193,400 Pa·s at 25° C. Prepreg tackiness of the resulting prepreg was measured, and results showed that the initial tackiness was 1.8 kgf (18 N) and the tackiness after 72 hours was 1.0 kgf (10 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 11

As shown in the column for Example 11 in Table 3, Torayca (registered trademark) T1100GC-12K was used as the reinforcing fiber, and except for this, the same procedure as in Example 7 was carried out to prepare a prepreg having a fiber areal weight of 100 g/m$^2$ and a fiber mass content of 72%. The areal weight of the prepreg was 138 g/m$^2$, and the average thickness of the prepreg was 99 μm. The viscosity in the region (I) of this prepreg was 255,600 Pa·s and 1 Pa·s at 25° C. and 80° C., respectively. In addition, the viscosity and the storage modulus in the region (II) were 37,600 Pa·s and 37,400 Pa, respectively, at 25° C. Furthermore, the viscosity of the epoxy resin composition contained in the prepreg was 194,200 Pa·s at 25° C. Prepreg tackiness of the resulting prepreg was measured, and results showed that the initial tackiness was 1.8 kgf (18 N) and the tackiness after 72 hours was 1.3 kgf (13 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 12

As shown in the column for Example 12 in Table 3, the resin areal weight was adjusted to 55 g/m$^2$, and except for this, the same procedure as in Example 9 was carried out to prepare a prepreg having a fiber mass content of 74%. The areal weight of the prepreg was 74 g/m$^2$, and the average thickness of the prepreg was 51 μm. The viscosity in the region (I) of this prepreg was 255,600 Pa·s and 1 Pa·s at 25° C. and 80° C., respectively. In addition, the viscosity and the storage modulus in the region (II) were 37,600 Pa·s and 37,400 Pa, respectively, at 25° C. Furthermore, the viscosity of the epoxy resin composition contained in the prepreg was 250,300 Pa·s at 25° C. Prepreg tackiness of the resulting prepreg was measured, and results showed that the initial tackiness was 1.6 kgf (16 N) and the tackiness after 72 hours was 1.1 kgf (11 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 13

As shown in the column for Example 13 in Table 3, a resin film of the resin A having an areal weight of 6 g/m$^2$ was used, and except for this, the same procedure as in Example 12 was carried out to prepare a prepreg having a fiber mass content of 81%. The areal weight of the prepreg was 68 g/m$^2$, and the average thickness of the prepreg was 47 μm. The viscosity in the region (I) of this prepreg was 255,600 Pa·s and 1 Pa·s at 25° C. and 80° C., respectively. In addition, the viscosity and the storage modulus in the region (II) were 37,600 Pa·s and 37,400 Pa, respectively, at 25° C. Furthermore, the viscosity of the epoxy resin composition contained in the prepreg was 241,800 Pa·s at 25° C. Prepreg tackiness of the resulting prepreg was measured, and results showed that the initial tackiness was 1.6 kgf (16 N) and the tackiness after 72 hours was 0.9 kgf (9 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 14

As shown in the column for Example 14 in Table 3, two films of the resin composition (f) having a fiber areal weight of 12 g/m$^2$ were attached to both surfaces of a prepreg precursor and pressed while heating, and except for this, the same procedure as in Example 7 was carried out to prepare a prepreg having a fiber areal weight of 100 g/m² and a fiber mass content of 67%. The areal weight of the prepreg was 150 g/m², and the average thickness of the prepreg was 110 μm. The viscosity in the region (I) of this prepreg was 255,600 Pa·s and 1 Pa·s at 25° C. and 80° C., respectively. In addition, the viscosity and the storage modulus in the region (II) were 37,600 Pa·s and 37,400 Pa, respectively, at 25° C. Furthermore, the viscosity of the epoxy resin composition contained in the prepreg was 151,500 Pa·s at 25° C. Prepreg tackiness of the resulting prepreg was measured, and results showed that the initial tackiness was 1.9 kgf (19 N) and the tackiness after 72 hours was 1.3 kgf (13 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 15

As shown in the column for Example 15 in Table 3, the resin composition (j) was used as the resin B, and except for this, the same procedure as in Example 7 was carried out to prepare a prepreg having a fiber areal weight of 100 g/m² and a fiber mass content of 72%. The areal weight of the prepreg was 138 g/m², and the average thickness of the prepreg was 98 μm. The viscosity in the region (I) of this prepreg was 255,600 Pa·s and 1 Pa·s at 25° C. and 80° C., respectively. In addition, the viscosity and the storage modulus in the region (II) were 30,000 Pa·s and 67,200 Pa, respectively, at 25° C. Furthermore, the viscosity of the epoxy resin composition contained in the prepreg was 190,000 Pa·s at 25° C. Prepreg tackiness of the resulting prepreg was measured, and results showed that the initial tackiness was 2.0 kgf (20 N) and the tackiness after 72 hours was 1.2 kgf (12 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 16

As shown in the column for Example 16 in Table 3, the resin composition (k) was used as the resin B, and except for this, the same procedure as in Example 7 was carried out to prepare a prepreg having a fiber areal weight of 100 g/m² and a fiber mass content of 72%. The areal weight of the prepreg was 138 g/m², and the average thickness of the prepreg was 97 μm. The viscosity in the region (1) of this prepreg was 255,600 Pa·s and 1 Pa·s at 25° C. and 80° C., respectively. In addition, the viscosity and the storage modulus in the region (11) were 33,800 Pa·s and 33,400 Pa, respectively, at 25° C. Furthermore, the viscosity of the epoxy resin composition contained in the prepreg was 182,300 Pa·s at 25° C. Prepreg tackiness of the resulting prepreg was measured, and results showed that the initial tackiness was 1.6 kgf (16 N) and the tackiness after 72 hours was 0.8 kgf (8 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Example 17

As shown in the column for Example 17 in Table 4, the resin composition (I) was used as the resin B, and except for this, the same procedure as in Example 12 was carried out to prepare a prepreg having a fiber areal weight of 55 g/m² and a fiber mass content of 74%. The areal weight of the prepreg was 74 g/m², and the average thickness of the prepreg was 52 μm. The viscosity in the region (I) of this prepreg was 255,600 Pa·s and 1 Pa·s at 25° C. and 80° C., respectively. In addition, the viscosity and the storage modulus in the region (11) were 37,200 Pa·s and 36,600 Pa, respectively, at 25° C. Furthermore, the viscosity of the epoxy resin composition contained in the prepreg was 249,600 Pa·s at 25° C. Prepreg tackiness of the resulting prepreg was measured, and results showed that the initial tackiness was 1.6 kgf (16 N) and the tackiness after 72 hours was 1.1 kgf (11 N), suggesting that high adhesiveness was realized both initially and after 72 hours. Wrap-around test of this prepreg was performed, and results showed that peeling did not occur even after 72 hours or more following the wrapping, proving good wrap-around property. Furthermore, the degree of curing after curing at 130° C. for 2 hours was 100%.

Comparative Example 1

As shown in the column for Comparative example 1 in Table 4, the epoxy resin composition (c) was used as the resin A and applied to mold release paper using a coater to prepare resin films having a resin areal weight of 19 g/m². Two of these resin films were attached to both surfaces of a sheet of reinforcing fibers (Torayca (registered trademark) T700SC-12K) aligned in one direction, and a pressure was applied while heating to ensure impregnation with the epoxy resin composition (c), thus preparing a prepreg having a fiber areal weight of 100 g/m² and a fiber mass content of 72%. The areal weight of the prepreg was 138 g/m², and the average thickness of the prepreg was 94 μm. The viscosity in the region (I) of this prepreg was 61,400 Pa·s and 9 Pa·s at 25° C. and 80° C., respectively. In addition, the viscosity and the storage modulus in the region (II) were 61,400 Pa·s and 161,500 Pa, respectively, at 25° C. Furthermore, the viscosity of the epoxy resin composition contained in the prepreg was 61,400 Pa·s at 25° C. Prepreg tackiness of the resulting prepreg was measured, and results showed that the initial tackiness was 1.1 kgf (11 N) and the tackiness after 72 hours was 0.7 kgf (7 N), suggesting that the initial adhesiveness was lower than required. Wrap-around test of this prepreg was performed, and results showed that peeling occurred in a few seconds, proving poor wrap-around property. However, the degree of curing after curing at 130° C. for 2 hours was 100%.

Comparative Example 2

As shown in the column for Comparative example 2 in Table 4, the epoxy resin (e) was used as the resin A, and except for this, the same procedure as in Comparative example 2 was earned out to prepare a prepreg having a fiber areal weight of 100 g/m² and a fiber mass content of 72%. The areal weight of the prepreg was 138 g/m², and the average thickness of the prepreg was 94 μm. The viscosity in the region (I) of this prepreg was 10,300 Pa·s and 48 Pa·s at 25° C. and 80° C., respectively. In addition, the viscosity and the storage modulus in the region (II) were 10,300 Pa·s and 76,600 Pa, respectively, at 25° C. Furthermore, the viscosity of the epoxy resin composition contained in the prepreg was 10,300 Pa·s at 25° C. Prepreg tackiness of the resulting prepreg was measured, and results showed that the initial tackiness was 2.1 kgf (21 N) and the tackiness after 72 hours was 0.3 kgf (3 N), suggesting that the adhesiveness after 72 hours was lower than required although the initial adhesive was high. Wrap-around test of this prepreg was performed, and results showed that peeling occurred in 24 hours, proving slightly poor wrap-around property. However, the degree of curing after curing at 130° C. for 2 hours was 100%.

Comparative Example 3

As shown in the column for Comparative example 3 in Table 4, the epoxy resin (f) was used as the resin A, and except for this, the same procedure as in Example 5 was carried out to prepare a prepreg having a fiber areal weight of 100 g/m² and a fiber mass content of 72%. The areal weight of the prepreg was 138 g/m², and the average thickness of the prepreg was 96 μm. The viscosity in the region (I) of this prepreg was 37,600 Pa·s and 2 Pa·s at 25° C. and 80° C., respectively. In addition, the viscosity and the storage modulus in the region (II) were 10,300 Pa·s and 76,600 Pa, respectively, at 25° C. Furthermore, the viscosity of the epoxy resin composition contained in the prepreg was 29,600 Pa·s at 25° C. Prepreg tackiness of the resulting prepreg was measured, and results showed that the initial tackiness was 2.1 kgf (21 N) and the tackiness after 72 hours was 0.6 kgf (6 N), suggesting that the adhesiveness after 72 hours was much lower than in Example 5. Wrap-around test of this prepreg was performed, and results showed that peeling occurred in 48 hours, proving slightly poor wrap-around property. However, the degree of curing after curing at 130° C. for 2 hours was 100%.

Comparative Example 4

As shown in the column for Comparative example 4 in Table 4, the epoxy resin (c) was used as the resin B, and except for this, the same procedure as in Example 7 was carried out to prepare a prepreg having a fiber areal weight of 100 g/m² and a fiber mass content of 72%. The areal weight of the prepreg was 138 g/m², and the average thickness of the prepreg was 98 μm. The viscosity in the region (I) of this prepreg was 37,600 Pa·s and 2 Pa·s at 25° C. and 80° C., respectively. In addition, the viscosity and the storage modulus in the region (II) were 61,400 Pa·s and 161,500 Pa, respectively, at 25° C. Furthermore, the viscosity of the epoxy resin composition contained in the prepreg was 201,500 Pa·s at 25° C. Prepreg tackiness of the resulting prepreg was measured, and results showed that the initial tackiness was 1.2 kgf (12 N) and the tackiness after 72 hours was 0.7 kgf (7 N), suggesting that the initial adhesiveness was much lower than in Example 7. Wrap-around test of this prepreg was performed, and results showed that peeling occurred in a few seconds, proving poor wrap-around property. However, the degree of curing after curing at 130° C. for 2 hours was 100%.

Comparative Example 5

As shown in the column for Comparative example 5 in Table 4, the epoxy resin (h) was used as the resin A, and except for this, the same procedure as in Comparative example 4 was carried out to prepare a prepreg having a fiber areal weight of 100 g/m² and a fiber mass content of 72%. The areal weight of the prepreg was 138 g/m², and the average thickness of the prepreg was 97 μm. The viscosity in the region (I) of this prepreg was 7,800 Pa·s and 7 Pa·s at 25° C. and 80° C., respectively. In addition, the viscosity and the storage modulus in the region (II) were 61,400 Pa·s and 161,500 Pa, respectively, at 25° C. Furthermore, the viscosity of the epoxy resin composition contained in the prepreg was 27,300 Pa·s at 25° C. Prepreg tackiness of the resulting prepreg was measured, and results showed that the initial tackiness was 0.9 kgf (9 N) and the tackiness after 72 hours was 0.5 kgf (5 N), suggesting that the adhesiveness was still lower than in Comparative example 4. Wrap-around test of this prepreg was performed, and results showed that peeling occurred in a few seconds, proving poor wrap-around property. However, the degree of curing after curing at 130° C. for 2 hours was 100%.

Comparative Example 6

As shown in the column for Comparative example 6 in Table 4, the epoxy resin (i) was used as the resin A, and except for this, the same procedure as in Comparative example 4 was carried out to prepare a prepreg having a fiber areal weight of 100 g/m² and a fiber mass content of 72%. The areal weight of the prepreg was 138 g/m², and the average thickness of the prepreg was 98 μm. The viscosity in the region (I) of this prepreg was 255,600 Pa·s and 1 Pa·s at 25° C. and 80° C., respectively. In addition, the viscosity and the storage modulus in the region (II) were 147,200 Pa·s and 92,500 Pa, respectively, at 25° C. Furthermore, the viscosity of the epoxy resin composition contained in the prepreg was 228,500 Pa·s at 25° C. Prepreg tackiness of the resulting prepreg was measured, and results showed that the initial tackiness was 1.1 kgf (11 N) and the tackiness after 72 hours was 0.7 kgf (7 N), suggesting that the initial adhesiveness was lower than in Comparative example 4. Wrap-around test of this prepreg was performed, and results showed that peeling occurred in a few seconds, proving poor wrap-around property. However, the degree of curing after curing at 130° C. for 2 hours was 100%.

Comparative Example 7

As shown in the column for Comparative example 7 in Table 4, a resin film of the resin A having an areal weight of 4 g/m² was used, and except for this, the same procedure as in Example 10 was carried out in an attempt to prepare a prepreg having a fiber areal weight of 100 g/m2 and a fiber mass content of 92%, resulting in a failure in production of a prepreg having a required shape.

TABLE 1

| Epoxy resin composition (parts by mass) | | (a) | (b) | (c) | (d) | (e) | (f) | (g) | (h) | (i) | (j) | (k) | (l) |
|---|---|---|---|---|---|---|---|---|---|---|---|---|---|
| Epoxy resin | jER 828 | 10 | 60 | 40 | 40 | 60 | 40 | 10 | 60 | 20 | 40 | 10 | 40 |
| | jER 1001 | 50 | 30 | 30 | 30 | 30 | 30 | 50 | 30 | 30 | 50 | 40 | 30 |
| | jER 154 | 40 | 10 | 30 | 30 | 10 | 30 | 40 | 10 | 50 | 10 | | 30 |
| | Araldite MY0600 | | | | | | | | | | | 50 | |
| Curing agent | Seikacure S | 6 | | | | | | | | | | | |
| | DICY7 | | 4 | 4 | 4 | 4 | 4 | 4 | | | 4 | 4 | |

TABLE 1-continued

| Epoxy resin composition (parts by mass) | | (a) | (b) | (c) | (d) | (e) | (f) | (g) | (h) | (i) | (j) | (k) | (l) |
|---|---|---|---|---|---|---|---|---|---|---|---|---|---|
| Curing accelerator | DCMU99 | | | 2 | 2 | 2 | 2 | 2 | 2 | 2 | 10 | 2 | 2 |
| Thermoplastic resin | Vinylec K | 9 | 5 | 1 | 7 | 3 | | 5 | 6 | | | | 3 |
| | Nanostrength M22N | | | | | | | | | | 10 | | |
| | Sumikaexcel PES 5003P | | | | | | | | | | | 2 | |

TABLE 2

| | Example 1 | Example 2 | Example 3 | Example 4 | Example 5 | Example 6 | Example 7 | Example 8 |
|---|---|---|---|---|---|---|---|---|
| Epoxy resin composition A | (a) | (a) | (c) | (c) | (c) | (c) | (g) | (g) |
| Epoxy resin composition B | (b) | (b) | (b) | (d) | (e) | (f) | (f) | (f) |
| Reinforcing fiber | T700SC | T700SC | T700SC | T700SC | 17008C | T700SC | T700SC | T700SC |
| Film areal weight of A (per film) [g/m$^2$] | 44 | 13 | 13 | 13 | 13 | 13 | 13 | 23 |
| Number of films of A | 2 | 2 | 2 | 2 | 2 | 2 | 2 | 2 |
| Film areal weight of B (per film) [g/m$^2$] | 12 | 12 | 12 | 12 | 12 | 12 | 12 | 12 |
| Number of films of B | 1 | 1 | 1 | 1 | 1 | 1 | 1 | 1 |
| Fiber areal weight [g/m$^2$] | 100 | 100 | 100 | 100 | 100 | 100 | 100 | 100 |
| Prepreg areal weight [g/m$^2$] | 200 | 138 | 138 | 138 | 138 | 136 | 138 | 158 |
| Fiber mass content [%] | 50 | 72 | 72 | 72 | 72 | 72 | 72 | 63 |
| Average thickness of prepreg [μm] | 151 | 96 | 95 | 95 | 96 | 95 | 98 | 114 |
| Viscosity in region (I) at 25° C. [Pa·s] | 148,900 | 148,900 | 61,400 | 61,400 | 61,400 | 61,400 | 255,600 | 255,600 |
| Viscosity in region (I) at 80° C. [Pa·s] | 15 | 15 | 9 | 9 | 9 | 9 | 1 | 1 |
| Viscosity in region (II) at 25° C. [Pa·s] | 23,800 | 23,800 | 23,800 | 14,700 | 10,300 | 37,600 | 37,600 | 37,600 |
| Storage modulus in region (II) at 25° C. [Pa] | 101,500 | 101,500 | 101,500 | 28,200 | 76,600 | 37,400 | 37,400 | 37,400 |
| Average viscosity of resin composition in prepreg at 25° C. [Pa·s] | 124,600 | 118,700 | 52,100 | 50,800 | 45,800 | 54,600 | 192,400 | 220,000 |
| Initial prepreg tackiness [kgf] | 2.3 | 1.5 | 1.5 | 1.4 | 2.3 | 1.7 | 1.8 | 1.9 |
| Prepreg tackiness after 72 hours [kgf] | 1.6 | 0.9 | 0.8 | 0.7 | 1.1 | 0.8 | 1.2 | 1.4 |
| Existence/absence of peeling after 72 hours in wrap-around test | absent | absent | absent | absent | absent | absent | absent | absent |
| Degree of curing after curing at 130° C. for 2 hours [%] | 70 | 80 | 100 | 100 | 100 | 100 | 100 | 100 |

TABLE 3

| | Example 9 | Example 10 | Example 11 | Example 12 | Example 13 | Example 14 | Example 15 | Example 16 |
|---|---|---|---|---|---|---|---|---|
| Epoxy resin composition A | (g) | (g) | (g) | (g) | (g) | (g) | (g) | (g) |
| Epoxy resin composition B | (f) | (f) | (f) | (f) | (f) | (f) | (f) | (k) |
| Reinforcing fiber | T700SC | M40JB | T1100GC | T700SC | T700SC | T700SC | T700SC | T700SC |
| Film areal weight of A (per film) [g/m$^2$] | 9 | 13 | 13 | 9 | 6 | 13 | 13 | 13 |
| Number of films of A | 2 | 2 | 2 | 2 | 2 | 2 | 2 | 2 |
| Film areal weight of B (per film) [g/m$^2$] | 1 | 12 | 12 | 1 | 1 | 12 | 12 | 12 |
| Number of films of B | 1 | 1 | 1 | 1 | 1 | 2 | 1 | 1 |
| Fiber areal weight [g/m$^2$] | 100 | 100 | 100 | 55 | 55 | 100 | 100 | 100 |
| Prepreg areal weight [g/m$^2$] | 119 | 138 | 138 | 74 | 68 | 150 | 138 | 138 |
| Fiber mass content [%] | 84 | 72 | 72 | 74 | 81 | 67 | 72 | 72 |
| Average thickness of prepreg [μm] | 80 | 100 | 99 | 51 | 47 | 110 | 98 | 97 |
| Viscosity in region (I) at 25° C. [Pa·s] | 255,600 | 255,600 | 255,600 | 255,600 | 255,600 | 255,600 | 255,600 | 255,600 |
| Viscosity in region (I) at 80° C. [Pa·s] | 1 | 1 | 1 | 1 | 1 | 1 | 1 | 1 |
| Viscosity in region (II) at 25° C. [Pa·s] | 37,600 | 37,600 | 37,600 | 37,600 | 37,600 | 37,600 | 30,000 | 33,800 |
| Storage modulus in region (II) at 25° C. [Pa] | 37,400 | 37,400 | 37,400 | 37,400 | 37,400 | 37,400 | 55,300 | 33,400 |
| Average viscosity of resin composition in prepreg at 25° C. [Pa·s] | 246,700 | 193,400 | 194,200 | 250,300 | 241,800 | 151,500 | 190,000 | 182,300 |
| Initial prepreg tackiness [kgf] | 1.6 | 1.8 | 1.8 | 1.6 | 1.6 | 1.9 | 2.0 | 1.6 |
| Prepreg tackiness after 72 hours [kgf] | 0.8 | 1.0 | 1.3 | 1.1 | 0.9 | 1.3 | 1.2 | 0.8 |
| Existence/absence of peeling after 72 hours in wrap-around test | absent | absent | absent | absent | absent | absent | absent | absent |
| Degree of curing after curing at 130° C. for 2 hours [%] | 100 | 100 | 100 | 100 | 100 | 100 | 100 | 100 |

TABLE 4

| | Example 17 | Comparative example 1 | Comparative example 2 | Comparative example 3 | Comparative example 4 | Comparative example 5 | Comparative example 6 | Comparative example 7 |
|---|---|---|---|---|---|---|---|---|
| Epoxy resin composition A | (g) | (c) | (e) | (f) | (g) | (h) | (g) | (g) |
| Epoxy resin composition B | (l) | — | — | (e) | (c) | (c) | (i) | (f) |
| Reinforcing fiber | T700SC | T700SC | T700SC | T700SC | T700SC | T700SC | T700SC | T700SC |
| Film areal weight of A (per film) [g/m$^2$] | 9 | 19 | 19 | 13 | 13 | 13 | 13 | 4 |
| Number of films of A | 2 | 2 | 2 | 2 | 2 | 2 | 2 | 2 |
| Film areal weight of B (per film) [g/m$^2$] | 1 | — | — | 12 | 12 | 12 | 12 | 1 |
| Number of films of B | 1 | — | — | 1 | 1 | 1 | 1 | 1 |
| Fiber areal weight [g/m$^2$] | 55 | 100 | 100 | 100 | 100 | 100 | 100 | 100 |
| Prepreg areal weight [g/m$^2$] | 74 | 138 | 138 | 138 | 138 | 138 | 138 | — |
| Fiber mass content [%] | 74 | 72 | 72 | 72 | 72 | 72 | 72 | — |
| Average thickness of prepreg [μm] | 52 | 94 | 94 | 96 | 98 | 97 | 98 | — |
| Viscosity in region (I) at 25° C. [Pa·s] | 255,600 | 61,400 | 10,300 | 37,800 | 255,600 | 7,800 | 255,600 | — |
| Viscosity in region (I) at 80° C. [Pa·s] | 1 | 9 | 48 | 2 | 1 | 7 | 1 | — |
| Viscosity in region (II) at 25° C. [Pa·s] | 37,200 | 61,400 | 10,300 | 10,300 | 61,400 | 61,400 | 147,200 | — |
| Storage modulus in region (II) at 25° C. [Pa] | 36,600 | 161,500 | 76,600 | 76,600 | 161,500 | 161,500 | 92,500 | — |
| Average viscosity of resin composition in prepreg at 25° C. [Pa·s] | 249,600 | 61,400 | 10,300 | 29,600 | 201,500 | 27,300 | 228,500 | — |
| Initial prepreg tackiness [kgf] | 1.6 | 1.1 | 2,1 | 2.1 | 1.2 | 0.9 | 1.1 | — |
| Prepreg tackiness after 72 hours [kgf] | 1.1 | 0.7 | 0.3 | 0.6 | 0.7 | 0.5 | 0.7 | — |
| Existence/absence of peeling after 72 hours in wrap-around test | absent | existent | existent | existent | existent | existent | existent | — |
| Degree of curing after curing at 130° C. for 2 hours [%] | 100 | 100 | 100 | 100 | 100 | 100 | 100 | — |

INDUSTRIAL APPLICABILITY

The prepreg of the present invention can maintain, for a long term, the ability to develop good adhesion rapidly under low pressure and in particular, because of having high handleability, it is preferred as material for producing sporting goods such as fishing rods and bicycle frames, which tend to require manual pasting operations in the molding step.

The invention claimed is:

1. A prepreg comprising reinforcing fibers and an epoxy resin composition, wherein the prepreg has a first upper surface and a second lower surface, has a fiber content of 90% by mass or less, and meets the following requirements (a) and (b):
    (a) the epoxy resin composition has a viscosity of 50,000 Pa·s or more and 300,000 Pa·s or less at 25° C. in a region (I) ranging from a depth of D/4 to 3D/4 from either of the first or second surfaces of the prepreg, wherein D represents the average thickness of the prepreg and D is 3 μm or more, and
    (b) the epoxy resin composition has a viscosity of 10,000 Pa·s or more and 40,000 Pa·s or less at 25° C. in a region (II) ranging from at least one of the first or second surfaces of the prepreg to a depth of 0.5 μm, and
    wherein the epoxy resin composition in the region (II) contains, based on 100 parts by mass of the epoxy resin, a curing agent in an amount of 0 to 6 parts by mass and a thermoplastic resin in an amount of 0 to 10 parts by mass.

2. The prepreg according to claim 1, wherein the prepreg has an initial prepreg tackiness of 1.4 kgf or more.

3. The prepreg according to claim 2, wherein the prepreg has a prepreg tackiness of 0.7 kgf or more after 72 hours.

4. The prepreg according to claim 2, wherein the prepreg has a prepreg tackiness of 0.7 kgf or more after 72 hours.

5. The prepreg according to claim 2, wherein the epoxy resin composition in the region (I) has a viscosity of 100,000 Pa·s or more and 300,000 Pa·s or less at 25° C.

* * * * *